United States Patent [19]

Danforth et al.

[11] Patent Number: 4,851,482

[45] Date of Patent: Jul. 25, 1989

[54] BLENDS AND ARTICLES OF LINEAR ALTERNATING POLYKETONE POLYMER WITH POLYURETHANE POLYMER

[75] Inventors: Richard L. Danforth, Missouri City; Dale L. Handlin, Jr.; William P. Gergen, both of Houston, all of Tex.; Robert G. Lutz, Santa Rosa, Calif.

[73] Assignee: Shell Oil Company, Houston, Tex.

[21] Appl. No.: 187,192

[22] Filed: Apr. 28, 1988

[51] Int. Cl.$^4$ .................. C08G 67/02; C08G 67/00; C08F 1/64

[52] U.S. Cl. .................. 525/455; 528/392; 525/539

[58] Field of Search .................. 525/455; 528/392

[56] References Cited

U.S. PATENT DOCUMENTS

| | | | | |
|---|---|---|---|---|
| 2,833,740 | 5/1958 | Verbanc | | 260/45.5 |
| 2,844,566 | 7/1958 | Schwarz et al. | | 260/79 |
| 2,929,800 | 3/1960 | Hill | | 260/77.5 |
| 2,933,477 | 4/1960 | Hostettler | | 260/77.5 |

FOREIGN PATENT DOCUMENTS 121965 10/1984 European Pat. Off. .
181014 5/1986 European Pat. Off. .
1081304 8/1967 United Kingdom .

OTHER PUBLICATIONS

Please note other pending application by same inventors U.S. Ser. No. 187,190 (Attorney Docket No. T4217); U.S. Ser. No. 179,682 (Attorney Docket No. T4324); U.S. Ser. No. 203,959 (Attorney Docket No. T4329); U.S. Ser. No. 203,973 (Attorney Docket No. T4379); U.S. Ser. No. 203,975 (Attorney Docket No. T4400).

*Primary Examiner*—Harold D. Anderson
*Assistant Examiner*—T. Mason
*Attorney, Agent, or Firm*—Wendy K. B. Buskop

[57] ABSTRACT

A process for preparing a blend of a linear alternating polymer of carbon monoxide and an ethylenically unsaturated hydrocarbon and a polyurethane polymer, the novel composition, as well as articles prepared from the blend and the blend prepared by the novel process.

25 Claims, No Drawings

BLENDS AND ARTICLES OF LINEAR ALTERNATING POLYKETONE POLYMER WITH POLYURETHANE POLYMER

BACKGROUND OF THE INVENTION

This invention is concerned with blends of thermoplastic polyurethane polymers and polyketone polymers.

The general class of polymers of carbon monoxide and one or more ethylenically unsaturated hydrocarbons has been known for some years. Brubaker, U.S. Pat. No. 2,495,286, produced such polymers of relatively low carbon monoxide content in the presence of free radical initiators such as benzoyl peroxide. British Pat. No. 1,081,304 produced such polymers of higher carbon monoxide content in the presence of alkylphosphine complexes of palladium as catalyst. Nozaki extended the process to produce linear alternating polymers in the presence of arylphosphine complexes of palladium. See, for example, U.S. Pat. No. 3,694,412.

More recently, the class of linear alternating polymers of carbon monoxide and at least one ethylenically unsaturated hydrocarbon has become of greater interest in part because of the availability of the polymers. These polymers, often referred to as polyketone or polyketone polymers have been shown to be of the repeating formula —CO-(A)— where A is the moiety of an ethylenically unsaturated hydrocarbon polymerized through the ethylenic unsaturation. For example, when the ethylenically unsaturated hydrocarbon is ethylene the polymer will be represented by the repeating formula —CO—(CH$_2$—CH$_2$)—. The general process for the more recent production of such polymers is illustrated by a number of published European patent applications including 121,965 and 181,014. These processes typically involve a catalyst composition formed from a compound of the Group VIII metals palladium, cobalt or nickel, the anion of a strong non-hydrohalogenic acid having a pKa below 6 and a bidentate ligand of phosphorus, arsenic or antimony.

The resulting polymers are relatively high molecular weight thermoplastics having utility in the production of shaped articles such as containers for the food and drink industry and parts for the automotive industry. For some particular applications it has been found to be desirable to have properties of a polymeric composition which are somewhat different from those of the polyketone polymer. It would be of advantage to retain the more desirable properties of the polyketone polymer and yet improve other properties. These advantages are often obtained through the provision of a polymer blend.

Blends of uncured polyurethane elastomer (which has been processed in a particular manner) with a polyketone, have been taught in U.S. Pat. No. 2,833,740 issued to Verbanc and assigned to DuPont. The specific types of polyketone/polyurethane blends disclosed therein were prepared from non-linear alternating ethylene/carbon monoxide copolymer to obtain UV degradable polyurethanes. The ratio of ethylene to carbon monoxide in the polyketone was between 5:1 and 12:1. These polymers used herein were not linear alternating polyketones.

In view of the known blends, it has been desired to provide blends of polyketones with a polyurethane polymer to result in new blends with a balance of properties which include a unique balance of toughness with stiffness, as well as overall strength and solvent resistance and abrasion resistance.

SUMMARY OF THE INVENTION

The present invention is a blend of a linear alternating polymer of carbon monoxide and at least one ethylenically unsaturated hydrocarbon with a polyurethane.

Further, the present invention is a process for preparing a blend of a linear alternating polymer of carbon monoxide and at least one ethylenically unsaturated hydrocarbon and a polyurethane polymer, wherein said process comprises the following steps:

(i) adding a linear alternating polymer of carbon monoxide and at least one ethylenically unsaturated hydrocarbon to a polyurethane polymer forming a mixture; and (ii) blending the mixture at temperatures between about 175° C. and about 300° C. therein forming a polymer blend.

The present invention also relates to a process for preparing a blend of linear alternating polymers of carbon monoxide and at least one ethylenically unsaturated hydrocarbon by a masterbatch process.

The present invention relates to articles prepared from the novel blends.

DETAILED DESCRIPTION OF THE INVENTION

The polyketone polymers which are employed as a component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, butylene, isobutylene, 1-octene, and 1-dodecene, or are arylaliphatic containing an aryl substituent on an otherwise aliphatic moiety, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketones are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the polyketone polymer is that of a linear alternating polymer of carbon monoxide and at least one ethylenically unsaturated hydrocarbon and the polymer will contain substantially one moiety of carbon monoxide for each moiety of unsaturated hydrocarbon. When terpolymers of carbon monoxide, ethylene and a second hydrocarbon are employed in the blends of the invention there will be within the terpolymer at least two units incorporating a moiety of ethylene for each unit incorporating a moiety of the second hydrocarbon, preferably from about 10 units to about 100 units incorporating a moiety of ethylene for each unit incorporating a moiety of the second hydrocarbon. The polymer chain is therefore represented by the formula

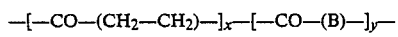

where B is the moiety obtained by polymerization of the second hydrocarbon through the ethylenic unsaturation. The —[—CO—(CH$_2$—CH$_2$—)— units and the —CO—(B)— units are found randomly throughout the polymer chain. In the modification of the invention where copolymers of carbon monoxide and ethylene are employed as a blend component and there is no second hydrocarbon in the polymer chain, the polymer is represented by the above formula wherein y=0. If y is other than 0, i.e., terpolymers are employed, ratios of y:x should be no more than 0.5 and preferably from about 0.01 to about 0.2 are preferred. The end groups or "caps" of the polymer chain will depend on what materials were present during the preparation of the polyketone polymer and whether and how the polymer was purified. The precise properties of the polymer will not depend to any considerable extent upon the particular end groups so that the polymer is fairly represented by the above formula for the polymer chain.

Of particular interest are those polyketones of high molecular weight from about 1,000 to about 500,000, especially those of molecular weight over 10,000. The physical properties of the polyketone polymers will depend in part on the molecular weight of the polymer, whether the polymer is a copolymer or a terpolymer and the proportion of the second hydrocarbon present in the case of a terpolymer.

Typical melting points are from about 175° C. to about 300° C., more typically from about 180° C. to about 285° C. Polyketone polymers usable herein may have melting points of between about 190°-230° C. and polymers with melting points ranging from about 230° C. to about 270° C. may be usable herein.

Useful polyketones for the novel blends have limiting viscosity numbers (LVN) as measured by the method wherein the polymer is dissolved in metacresol at 60° C.; using a standard capillary viscosity measuring device, such as a Cannon-Ubbelohde viscometer in the range of 0.5 to 10 LVN and more preferably 0.8 to 4 LVN and most preferably 0.8 to 2.5 LVN.

A method of producing the polyketone polymers which is now becoming conventional is to contact the carbon monoxide and ethylenically unsaturated hydrocarbon(s) in the presence of a palladium compound, the anion of a non-hydrohalogenic acid having a pKa below about 6 and a bidentate phosphorus ligand. The scope of the process of polyketone production is extensive but, without wishing to be limited, a preferred palladium compound is a palladium carboxylate, particularly palladium acetate, the preferred anion is the anion of trifluoroacetic acid or p-toluenesulfonic acid, and the preferred bidentate ligand is 1,3-bis(diphenylphosphino)propane or 1,3-bis[di(2-methoxyphenyl)-phosphino]propane. Such a process for polyketone production is illustrated by copending U.S. application Ser. No. 930,468, filed Nov. 14, 1986.

Polymerization is conducted in a gas phase in either the absence of diluent or the substantial absence of diluent or in a liquid phase in the presence of an inert diluent such as an alkanol, e.g., methanol or ethanol. The reactants are contacted under polymerization conditions in the presence of the catalyst composition by conventional methods such as shaking or stirring. Suitable reaction temperatures are from about 20° C. to about 150° C., preferably from about 50° C. to about 135° C. Typical reaction pressures are from about 1 bar to about 200 bar, more typically from about 10 bar to about 100 bar. Subsequent to reaction the polymer product is recovered as by decantation or filtration. The polymer product may contain residues of the catalyst which are removed, if desired, by treatment with a solvent or a complexing agent which is selective for the residues.

Polyurethane polymers usable in the scope of the present invention include thermoplastic polyurethanes such as polyester based polyurethanes and polyether based polyurethanes. It has been found that a variety of Estanes ™ available from B. F. Goodrich are suitable polyurethanes usable in the scope of the present invention. In particular, Estane ™ 58133 and Estane 58122 which are ester based polyurethanes. Estane 58133 with a Shore D55 with a 220° C. processing temperature and Estane 58122 with a Shore A75 with a 198° C. processing temperature are useful herein. Estane ™ 58810 and Estane ™ 58881 which are ether-based polyurethanes are usable herein. Estane 58881 with a Shore A80 and a processing temperature of 198° C. and Estane 58810 with a Shore D42 and a processing temperature of 198° C. are usable herein.

The polyurethane polymers which may be used within the scope of the present invention include those which are prepared from long chain polyols reacted with diisocyanates and chain extenders. Polyols can be of two basic types, either polyester-type or polyether-type. Polyester-type polyols usable herein can be hydroxyl terminated polyesters prepared from adipic acid and an excess of glycol, such as ethylene glycol, neopentyl glycol, hexanediol-1,6, and the like or mixtures thereof. Polyethers usable herein include poly(oxypropylene) glycols and poly(oxytetramethylene) glycols. For example, polyalkyleneether glycols can be mixed with a molar excess of an organic diisocyanates to form urethane linkages in a linear polymer. This linear polymer can be reacted with a chain extending agent, such as water, diamine, or a hydroxy-amine.

The term "polyalkyleneether glycol" refers to a polyalkyleneether which contains terminal hydroxy groups. These compounds for example, can be derived from the polymerization of cyclic ethers such as alkylene oxides or dioxolane or from the condensation of glycols. They are sometimes known as polyalkylene glycols or polyalkylene oxide glycols. Those useful herein may be represented by the formula HO(RO)$_n$H, in which R stands for an alkylene radical and n is an integer sufficiently large that the molecular weight of the compound is at least 750, i.e. large enough that the polyoxalkylene group —(RO)$_n$— has a formula weight of at least 732. Not all of the alkylene radicals present need be the same. Glycols containing a mixture of radicals, as in the compound HO(CH$_2$OC$_2$H$_4$O)$_n$H can be used. These glycols are either viscous liquids or waxy solids. To be of value in preparing the usable polyurethanes, the molecular weight of the glycol should be at least 750 and may be as high as 10,000. The molecular weight is preferably between 750 and 3,500. Polytetramethyleneether glycol, is a usable glycol for making the usable polyurethane. Polyethyleneether glycol, polypropyleneether glycol and poly-1,2-dimethyleneether glycol are representative of other operable glycol compounds.

Additionally, polyether-thioether glycols, polyalkylenearylene-ether glycols and polyalkylene-arylene-ether glycols are examples of this first class of polyols. Of the second class of polyols usable herein, e.g. the polyesters, there are conceptually two classes, poly(oxypropylene) glycols and poly(oxytetramethylene) glycols. As an example, polyalkylene ester glycols can be usable herein.

The term "polyalkyleneester glycol" refers to a polyalkyleneester which contains terminal hydroxy groups and may be represented by the formula

in which R stands for an alkylene radical and n is an integer sufficiently large that the molecular weight of the compound is at least 750. Glycols can contain a mixture of radicals. The compound ethylene glycol, can be used with this ester. Other glycols can include 1,4-butanediol, 1,6-hexanediol, hydroquinone, bis(2-hydroxyethyl) ether, are representative of other operable compounds. The molecular weight of the glycol should be at least 750 and may be as high as 10,000. The molecular weight is preferably between 750 and 3500.

Any of a wide variety of diisocyanate compounds may be used in the polymerization to prepare the polyurethane polymer usable herein. Aromatic diisocyanates, such as toluene-2,4-diisocyanate (and its dimers), 4,4'-methylene-bis(phenyl isocyanate), 1,5-naphthylene diisocyanate and 4-tertbutyl m-phenylene diisocyanate are usable herein. Diphenyl methane diisocyanate may be particularly advantageous for use herein. This compound is available from Upjohn Polymer Chemicals as Isonate TM 215, and can be used in crude form or in pure form. Aliphatic compounds such as hexamethylene diisocyanate and tetramethylene diisocyanate, and the alicyclic compounds such as 1,4-cyclohexylene diisocyanate may be operable. Of the wide variety of diisocyanates usable herein, including but not limited to: 1,3-bis(3-isocyanato-p-tolyl) urea; 4,4'-methylene di-o-tolylisocyanate; 4-methoxy-m-phenylene diisocyanate; 4-propyloxy-m-phenylene diisocyanate; 4-chloro-m-phenylene diisocyanate; 4-bromo-m-phenylene diisocyanate; hexamethylene diisocyanate; tetramethylene diisocyanate; and 1,4-cyclohexylene diisocyanate, may be operable herein.

In addition, the following polyisocyanates may be usable:

isophorone diisocyanate:
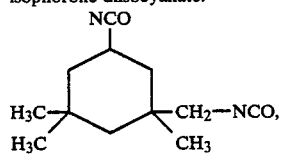

4,4'-dicyclohexylene methane diisocyanate:
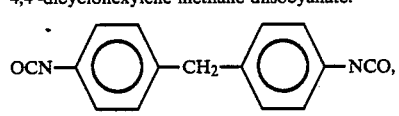

3,3'-dimethyl-4,4'-bisphenyl diisocyanate:
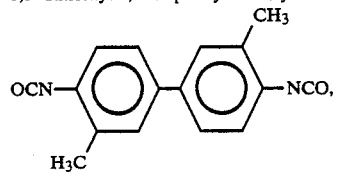

1,4-benzene diisocyanate:

-continued
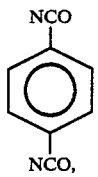

1,5-naphthalene diisocyanate:
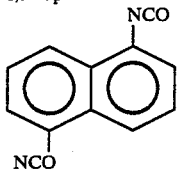

It is to be understood that these diisocyanates may be used either singly or in combination.

The chain-extending agent can contain a plurality of active hydrogen atoms, with up to two atoms in the molecule having active hydrogen attached thereto. A preferred chain extending agent is 1,4-butanediol. Suitable chain-extending agents include glycols, diamines, dicarboxy acids, dicarboxy amides, disulfonic acids and disulfonamides. Representative compounds include ethylene diamine, m-tolylene diamine, benzidine, diethylene glycol, hydrazine, succinic acid and 1,4-butanedisulfonic acid. (1,4-butanediol is available from Dupont.)

Urethane polymers contemplated as possibly usable herein include conventional reactive urethane polymers. These polymers include multifunctional urethanes prepared from isocyanates.

The polyurethane polymer can be prepared by either mixing all of the ingredients together or by first reacting the polyol with the diisocyanate then reacting that combination with the chain extender, either by batch method, in a mixing chamber or extruder.

The blends described herein form a compound having mechanical integrity.

The blends of the instant invention can be obtained by blending together a mixture of (a) a polyketone polymer and (b) a polyurethane polymer wherein components (a) and (b) are blended in relative proportions by weight within a range of from 1:99 to 99:1 parts based on 100 parts of (a) and (b) combined.

A suitable blend based on 100 parts of (a) and (b) combined is prepared from about 95 to 5 parts of (a) and, correspondingly, from about 5 to 95 parts of (b). Components (a) and (b) may also be blended in relative proportions ranging from about 10:90 to 90:10; 20:80 to 80:20; 30:70 to 70:30; 40:60 to 60:40; and in equal amounts by weight, i.e. (a):(b)=50:50.

It is to be understood that in the specification and claims herein, unless otherwise indicated, the amount of the polyurethane polymer or polyketone is expressed in terms of percent by weight, it is meant percent by weight based on the total amount of the blend.

The method of producing the blend of the polyketone polymer and the polyurethane polymer is not material as long as a relatively uniform distribution of the polyurethane polymer through the polyketone is obtained. It is preferred for the blend to have intimate mixing of the polymers, i.e. microscopically distribution of urethane through the polyketone having the size of the dispersed phase to be no more than 10 microns, preferably about 1 micron. In one modification the blend components are extruded and the blend is obtained as the extrudate. In an alternate modification the components are blended in other mixing devices which exhibit high shear.

The blend of polyketone polymer and polyurethane polymer can be prepared by the following process: mixing together the desired parts of polyketone with the desired parts of the polyurethane.

In one example, pellets of each polymer are mixed together in drums or tumblers.

The blended pellets are then poured into a feeder attached to a 15 mm co-rotating twin screw extruder, such as one made by Baker Perkins. A 30 mm twin screw extruder may also be used, such as a Werner and Pfleiderer extruder. Even larger equipment is contemplated as useful herein. The feed rate can be set at different rates without affecting the resultant product. The pellets can be starve fed (less than the capacity of the feed) or flood fed (more than the capacity of the hopper). The extruder can be run at a variety of speeds, such as 300 rpm for a 15 mm extruder.

The resulting extruded strand is preferably quenched in water at room temperature, then fed into a chopper to form pellets. Pellets can then be used to make parts, articles, containers, etc. in conventional thermoplastic processing equipment. The extruder can be run at temperatures ranging from about 175° C. to about 300° C. A preferred temperature range can be 190° C. to 285° C. The processing conditions will have to be regulated such as by limiting residence of time of the contents of the mixing device in order to limit possible polymer degradation and achieve desired intimate mixing of the polymers.

Test specimens for microtensile testing were prepared by drying the formed pellets in a vacuum oven at 40° C. for about 8 hours. Pellets were then compression molded into plaques between 5 and 30 mils in thickness at 245° C. for 1½ minutes, using for example, a Carver hydraulic press. Plaques were then be cut into specimens for microtensile testing. The results follow.

For tensile strength tests, the plaques were cut into Microtensile testing specimens having a dumbbell shape similar to specimens formed using ASTM D1708 test dies. The specimens described below were tested in a Minimaterials Tester made by Polymer Laboratories.

A variety of formultions of polypolyurethane polymer and polyketone polymer were prepared and tested for specific properties. The specific formulations are described below with the results of the physical property tests appearing in Table I-V.

Alternative methods for preparing a blend can be used within the scope of this invention. For example, a masterbatch method can be used to form the unique blend. In a masterbatch process, a first polyketone can be blended, (such as by tumbling) with a polyurethane. This first blend can be blended in the extruder at temperatures of 170° C. to 300° C., extruded and quenched as described above. The resulting strand can be chopped into blend pellets. These blended pellets can then be mixed with a second polyketone polymer or alternatively, added to additional first polyketone polymer in pellet form. These mixed blend pellets and polyketone polymers can be blended at temperature that range from 170° C. to 300° C., extruded and quenched as described above.

ILLUSTRATIVE FORMULATIONS

The Polyketone Polymer

100wt% polyketone 087/014

A linear alternating polymer of carbon monoxide, ethylene and propylene (087/014) was produced in the presence of a catalyst composition formed from palladium acetate, the anion of trifluoroacetic acid and 1,3-bis[di(2-methoxypenyl)phosphino]propane 0.5 wt% Irganox 1076 +0.27 wt% Ionol stabilizers were added to the resultant polymer. The melting point of the polymer was 196° C. and the polymer had a limiting viscosity number (LVN) of 1.68 when measured in m-cresol at 60° C.

Formulated Blends

Various blends of the polyketone polymer described as 087/014 and polyurethane polymers were produced. In one series of blends, polyurethane polymer used was Estane 58122, an ester based polyurethane obtained from B. F. Goodrich. The polyketone polymer and the Estane 58122 were passed through a 15 mil twin screw Baker Perkins extruder. The extruder temperature was 240° C. operating with undried feed under a nitrogen blanket. The extruder was operated at 300 RPM to produce a residence time of 0.5 minutes and the extruded strands were passed directly into water. Blends were made in ratios of polyketone to polyurethane of 80/20, 60/40, 40/60, and 20/80, respectively. The results appear on Table 1.

A series of additional blends were prepared in a manner identical to that described above with three other Estanes from Goodrich, Estane 58113, 58881, and 58810.

Mechanical testing of these blends used small plates of the various blends and a zero gauge length (ZGL) testing technique. This technique employs a double notched specimen having dimensions of a zero gauge length, e.g. 0.1 inches width between the notches and 0.01 inch (thickness) produced by compression molding of the blend. A pneumatic drive was used to separate the ends of the sample at a controlled rate of up to 500 in./minute while a piezoelectric transducer measures deformation or failure of a sample. (An environment chamber controls humidity as well as temperature.) ZGL failure times are on the order of 100–500 microseconds. Data obtained by the test can be used to determine values for impact strength.

Microtensile testing results are presented in Table II for blends of Carilon 087/014 with various Estane polymers. Average tensile strength, average modulus and average elongation are shown for the various blends.

Table III, IV and V show ZGL test results for Carilon 87/0014 with Estane 58133, Carilon 87/014 with Estane 58881, and Carilon 87/014 with Estane 58810, respectively.

It is anticipated that polyketone blends prepared from all types of polyurethanes, polyether-based, polyester based, low density thermoplastic polyurethanes, and high density polyurethanes will provide with substantially similar behavior. It is also anticipated that combinations of the different types of polyurethanes, when blended with polyketone, will also react in a similar manner.

As many widely different embodiments of this invention may be made without departing from the spirit and scope therefore, it is to be understood that this invention is not limited to the specific embodiments thereof except as defined in the claims.

TABLE I

| COMPOSITION | ZGL Test Data (POLYKETONE:URETHANE) RATIO | IMPACT STRENGTH Kilo-Joules/Meters$^2$ |
|---|---|---|
| CARILON 87/014/ESTANE 58122 | 0:100 | 51.8 |
| CARILON 87/014/ESTANE 58122 | 0:100 | 35.9 |
| CARILON 87/014/ESTANE 58122 | 0:100 | 52.4 |
| CARILON 87/014/ESTANE 58122 | 0:100 | 46.3 |
| CARILON 87/014/ESTANE 58122 | 20:80 | 82.3 |
| CARILON 87/014/ESTANE 58122 | 20:80 | 118 |
| CARILON 87/014/ESTANE 58122 | 20:80 | 81.7 |
| CARILON 87/014/ESTANE 58122 | 20:80 | 36.3 |
| CARILON 87/014/ESTANE 58122 | 40:60 | 2.7 |
| CARILON 87/014/ESTANE 58122 | 40:60 | 8.3 |
| CARILON 87/014/ESTANE 58122 | 40:60 | 23.6 |
| CARILON 87/014/ESTANE 58122 | 40:60 | 59 |
| CARILON 87/014/ESTANE 58122 | 60:40 | 38.7 |
| CARILON 87/014/ESTANE 58122 | 60:40 | 9.3 |
| CARILON 87/014/ESTANE 58122 | 60:40 | 37.5 |
| CARILON 87/014/ESTANE 58122 | 60:40 | 45.1 |
| CARILON 87/014/ESTANE 58122 | 60:40 | 20.9 |
| CARILON 87/014/ESTANE 58122 | 80:20 | 32.4 |
| CARILON 87/014/ESTANE 58122 | 80:20 | 33.6 |
| CARILON 87/014/ESTANE 58122 | 80:20 | 36.6 |
| CARILON 87/014/ESTANE 58122 | 80:20 | 35.7 |
| CARILON 87/014/ESTANE 58122 | 80:20 | 36.7 |
| CARILON 87/014/ESTANE 58122 | 100:0 | 7.2 |
| CARILON 87/014/ESTANE 58122 | 100:0 | 12.8 |
| CARILON 87/014/ESTANE 58122 | 100:0 | 20.6 |
| CARILON 87/014/ESTANE 58122 | 100:0 | 24.8 |
| CARILON 87/014/ESTANE 58122 | 100:0 | 2.9 |

Carilon 87/014 is a 195° C. mp ethylene/propylene terpolymer. Estane 58122 is an ester-based polyurethane with a Shore A75 and a 198° C. processing temperature.

TABLE II

| CARILON/ESTANE (%)/(%) | | AVERAGE TENSILE STRENGTH (KPSI) | AVERAGE MODULUS (PSI) | AVERAGE ELONGATION (%) |
|---|---|---|---|---|
| ESTANE 58881 | | | | |
| 100 | 0 | 9.553 | 128467 | 364 |
| 80 | 20 | 4.216 | 67163 | 66 |
| 60 | 40 | 2.290 | 26483 | 79 |
| 40 | 60 | 1.969 | 7166 | 276 |
| 20 | 80 | 2.278 | 3162 | 542 |
| 0 | 100 | 1.818 | 1965 | 542 |
| ESTANE 58810 | | | | |
| 100 | 0 | 9.553 | 128467 | 364 |
| 80 | 20 | 4.647 | 82163 | 52 |
| 60 | 40 | 4.206 | 48618 | 168 |
| 40 | 60 | 3.733 | 21063 | 283 |
| 20 | 80 | 4.269 | 10805 | 439 |
| 0 | 100 | 3.973 | 6570 | 536 |
| ESTANE 58133 | | | | |
| 100 | 0 | 9.553 | 128467 | 364 |
| 80 | 20 | 7.112 | 85197 | 276 |
| 60 | 40 | 7.965 | 53030 | 376 |
| 40 | 60 | 7.987 | 37270 | 424 |
| 20 | 80 | 8.095 | 24070 | 443 |
| 0 | 100 | 8.310 | 18353 | 511 |
| 58122 | | | | |
| 100 | 0 | 9.553 | 128467 | 364 |
| 80 | 20 | 8.571 | 90278 | 387 |
| 60 | 40 | 3.655 | 35380 | 195 |
| 40 | 60 | 2.458 | 6242 | 275 |
| 20 | 80 | 2.701 | 2181 | 535 |
| 0 | 100 | 2.424 | 1129 | 483 |

TABLE III

ZGL Test Data

| COMPOSITION | RATIO | IMPACT STRENGTH KJ/M2 |
|---|---|---|
| CARILON 87/014/ESTANE 58133 | 0/100 | 155.6 |
| CARILON 87/014/ESTANE 58133 | 0/100 | 123.7 |
| CARILON 87/014/ESTANE 58133 | 0/100 | 114.6 |
| CARILON 87/014/ESTANE 58133 | 0/100 | 124.4 |
| CARILON 87/014/ESTANE 58133 | 20/80 | 80.6 |
| CARILON 87/014/ESTANE 58133 | 20/80 | 132.7 |
| CARILON 87/014/ESTANE 58133 | 20/80 | 32.6 |
| CARILON 87/014/ESTANE 58133 | 40/60 | 90.8 |

TABLE III-continued

ZGL Test Data

| COMPOSITION | RATIO | IMPACT STRENGTH KJ/M2 |
|---|---|---|
| CARILON 87/014/ESTANE 58133 | 40/60 | 92.5 |
| CARILON 87/014/ESTANE 58133 | 40/60 | 61.6 |
| CARILON 87/014/ESTANE 58133 | 40/60 | 113.3 |
| CARILON 87/014/ESTANE 58133 | 60/40 | 81.8 |
| CARILON 87/014/ESTANE 58133 | 60/40 | 152.2 |
| CARILON 87/014/ESTANE 58133 | 60/40 | 123.1 |
| CARILON 87/014/ESTANE 58133 | 60/40 | 169.8 |
| CARILON 87/014/ESTANE 58133 | 60/40 | 77.8 |
| CARILON 87/014/ESTANE 58133 | 80/20 | 81 |
| CARILON 87/014/ESTANE 58133 | 80/20 | 102 |
| CARILON 87/014/ESTANE 58133 | 80/20 | 67.8 |
| CARILON 87/014/ESTANE 58133 | 80/20 | 61.9 |

Carilon 014 is a polyketone with a 195 mp ethylene/propylene terpolymer.

TABLE IV

ZGL Test Data

| COMPOSITION | RATIO | IMPACT STRENGTH KJ/M2 |
|---|---|---|
| CARILON 87/014/ESTANE 58881 | 0/100 | 37.2 |
| CARILON 87/014/ESTANE 58881 | 0/100 | 37.5 |
| CARILON 87/014/ESTANE 58881 | 0/100 | 38.7 |
| CARILON 87/014/ESTANE 58881 | 0/100 | 35.6 |
| CARILON 87/014/ESTANE 58881 | 0/100 | 54.7 |
| CARILON 87/014/ESTANE 58881 | 20/80 | 45.4 |
| CARILON 87/014/ESTANE 58881 | 20/80 | 49.9 |
| CARILON 87/014/ESTANE 58881 | 20/80 | 39.2 |
| CARILON 87/014/ESTANE 58881 | 20/80 | 51.4 |
| CARILON 87/014/ESTANE 58881 | 40/60 | 72.8 |
| CARILON 87/014/ESTANE 58881 | 40/60 | 75.3 |
| CARILON 87/014/ESTANE 58881 | 40/60 | 82.9 |
| CARILON 87/014/ESTANE 58881 | 40/60 | 72.2 |
| CARILON 87/014/ESTANE 58881 | 40/60 | 79.1 |
| CARILON 87/014/ESTANE 58881 | 60/40 | 45.5 |
| CARILON 87/014/ESTANE 58881 | 60/40 | 57.4 |
| CARILON 87/014/ESTANE 58881 | 60/40 | 18.1 |
| CARILON 87/014/ESTANE 58881 | 60/40 | 27.9 |
| CARILON 87/014/ESTANE 58881 | 60/40 | 48.9 |
| CARILON 87/014/ESTANE 58881 | 80/20 | 79.1 |
| CARILON 87/014/ESTANE 58881 | 80/20 | 36.7 |
| CARILON 87/014/ESTANE 58881 | 80/20 | 37.4 |
| CARILON 87/014/ESTANE 58881 | 80/20 | 54.3 |

TABLE V

ZGL Test Data

| COMPOSITION | RATIO | IMPACT STRENGTH KJ/M2 |
|---|---|---|
| CARILON 87/014/ESTANE 58810 | 0/100 | 85.7 |
| CARILON 87/014/ESTANE 58810 | 0/100 | 97.7 |
| CARILON 87/014/ESTANE 58810 | 0/100 | 85.3 |
| CARILON 87/014/ESTANE 58810 | 0/100 | 73.8 |
| CARILON 87/014/ESTANE 58810 | 0/100 | 51.2 |
| CARILON 87/014/ESTANE 58810 | 20/80 | 93.7 |
| CARILON 87/014/ESTANE 58810 | 20/80 | 68.6 |
| CARILON 87/014/ESTANE 58810 | 20/80 | 103 |
| CARILON 87/014/ESTANE 58810 | 20/80 | 76.5 |
| CARILON 87/014/ESTANE 58810 | 20/80 | 80.1 |
| CARILON 87/014/ESTANE 58810 | 40/60 | 96.2 |
| CARILON 87/014/ESTANE 58810 | 40/60 | 64.3 |
| CARILON 87/014/ESTANE 58810 | 40/60 | 96.2 |
| CARILON 87/014/ESTANE 58810 | 40/60 | 75.9 |
| CARILON 87/014/ESTANE 58810 | 40/60 | 43.7 |
| CARILON 87/014/ESTANE 58810 | 60/40 | 74.4 |
| CARILON 87/014/ESTANE 58810 | 60/40 | 154.9 |
| CARILON 87/014/ESTANE 58810 | 60/40 | 72.3 |
| CARILON 87/014/ESTANE 58810 | 60/40 | 77.2 |
| CARILON 87/014/ESTANE 58810 | 60/40 | 55.7 |
| CARILON 87/014/ESTANE 58810 | 80/20 | 79.2 |
| CARILON 87/014/ESTANE 58810 | 80/20 | 99.4 |
| CARILON 87/014/ESTANE 58810 | 80/20 | 73.3 |
| CARILON 87/014/ESTANE 58810 | 80/20 | 54.9 |

TABLE V-continued

ZGL Test Data

| COMPOSITION | RATIO | IMPACT STRENGTH KJ/M2 |
|---|---|---|
| CARILON 87/014/ESTANE 58810 | 80/20 | 59.4 |

What is claimed:

1. A composition comprising a blend of a linear alternating polymer of carbon monoxide and at least one ethylenically unsaturated hydrocarbon and a polyurethane polymer.

2. The composition of claim 1, wherein said linear alternating polymer is of the formula $$-[-C-CO-(CH_2-CH_2)]_x-[-CO-(B)-]_y-$$

wherein B is the moiety of an ethylenically unsaturated α-olefin of at least 3 carbon atoms polymerized through the ethylenic unsaturation, the ratio of y:x is no more than about 0.5.

3. The composition of claim 1, wherein said linear alternating polymer is of the formula $$-[-C-CO-(CH_2-CH_2)]_x-[-CO-(B)-]_y-$$

wherein B is the moiety of an ethylenically unsaturated α-olefin of at least 3 carbon atoms polymerized through the ethylenic unsaturation, and wherein group B of said linear alternating polymer is propylene, and the ratio of y:x is from about 0.01 to about 0.2.

4. The composition of claim 2, wherein said linear alternating polymer comprises the moiety of a second ethylenically unsaturated hydrocarbon.

5. The composition of claim 2 where y is zero.

6. The composition of claim 1, wherein the polyurethane polymer is a polyurethane prepared from a member of the group (a) and (b), wherein group (a) represents polyurethane polymers prepared from polyalkylene ester glycols and diisocyanates then reacted with at least one chain extending agent, and group (b) represents polyurethane polymers prepared from polyalkylene ether glycols and diisocyanates, then reacted with at least one chain extending agent.

7. The composition of claim 1, wherein the ratio of linear alternating polymer of carbon monoxide and at least one ethylenically unsaturated hydrocarbon to polyurethane polymer is between about 1:99 and about 99:1, respectively.

8. The composition of claim 7, wherein the ratio is between about 5:95 and about 95:5, respectively.

9. A process for preparing a blend of Component (A), a linear alternating polymer of carbon monoxide and at least one ethylenically unsaturated hydrocarbon and Component (B), a polyurethane polymer, wherein said process comprises the following steps:
 (i) adding Component (A), a linear alternating polymer and at least one ethylenically unsaturated hydrocarbon to Component (B), a polyurethane polymer therein forming a mixture; and
 (ii) heating the mixture at temperatures between about 175° C. and about 300° C. therein forming a polymer blend.

10. The process of claim 9, wherein said linear alternating polymer is of the formula $$-[-C-CO-(CH_2-CH_2)]_x-[-CO-(B)-]_y-$$

wherein B is the moiety of an ethylenically unsaturated α-olefin of at least 3 carbon atoms polymerized through the ethylenic unsaturation, the ratio of y:x is no more than about 0.5.

11. The process of claim 9, wherein said linear alternating polymer is of the formula $$-[-C-CO-(CH_2-CH_2)]_x-[-CO-(B)-]_y-$$

wherein B is the moiety of an ethylenically unsaturated α-olefin of at least 3 carbon atoms polymerized through the ethylenic unsaturation, and wherein group B of said linear alternating polymer is propylene and the ratio of y:x is from about 0.01 to about 0.2.

12. The process of claim 9, wherein said linear alternating polymer comprises a moiety of a second ethylenically unsaturated hydrocarbon.

13. The process of claim 10, wherein y is zero.

14. The process of claim 9, wherein the polyurethane is a polyurethane prepared from a member of the group (a) and (b) wherein (a) represents those polyurethanes prepared from polyalkylene ester glycols and diisocyanates then reacted with at least one chain extending agent, and group (b) represents those polyurethanes prepared from polyalkylene ether glycols and diisocyanates, then reacted with at least one chain extending agent.

15. The process of claim 9, wherein the blending is performed at temperatures between about 190° C. and about 285° C.

16. The process of claim 9, wherein the ratio of linear alternating polymer of carbon monoxide and at least one ethylenically unsaturated hydrocarbon to polyurethane polymer is between about 1:99 and about 99:1 respectively.

17. The process of claim 16, wherein the ratio is between about 5:95 and about 95:5, respectively.

18. The process of claim 9, wherein blending is performed in a high shear mixing apparatus.

19. The process of claim 9, further comprising:
(iii) extruding said blend forming a masterbatch;
(iv) blending the masterbatch with a second polyketone polymer forming a mixture; and
(v) blending the mixture at temperatures between about 175° C. and about 300° C.

20. The process of claim 19, wherein the second polyketone polymer is the same polymer as the first polyketone polymer.

21. An article prepared from the composition of claim 1.

22. The article prepared from the composition of claim 2.

23. An article prepared from a composition comprising a blend prepared by the process of claim 9.

24. An article prepared from a composition prepared from the process of claim 10.

25. An article prepared from a composition prepared by the process of claim 19.

* * * * *